(12) United States Patent
He et al.

(10) Patent No.: US 12,052,711 B2
(45) Date of Patent: *Jul. 30, 2024

(54) BASE STATION OPERATIONS DURING A UE-INITIATED CHANNEL ACCESS PROCEDURE

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 17/310,096

(22) PCT Filed: Aug. 5, 2020

(86) PCT No.: PCT/CN2020/107212
§ 371 (c)(1),
(2) Date: Jul. 16, 2021

(87) PCT Pub. No.: WO2022/027366
PCT Pub. Date: Feb. 10, 2022

(65) Prior Publication Data
US 2022/0322401 A1    Oct. 6, 2022

(51) Int. Cl.
*H04W 72/20* (2023.01)
*H04W 16/14* (2009.01)
*H04W 74/0808* (2024.01)

(52) U.S. Cl.
CPC ....... *H04W 72/20* (2023.01); *H04W 74/0808* (2013.01)

(58) Field of Classification Search
CPC ............. H04W 72/20; H04W 74/0808; H04W 16/14
See application file for complete search history.

(56) References Cited

U.S. PATENT DOCUMENTS

| 11,706,631 B2 * | 7/2023 | Wang | H04W 74/0808 370/329 |
| 2016/0192326 A1 * | 6/2016 | Park | H04W 4/06 370/312 |

(Continued)

FOREIGN PATENT DOCUMENTS

| CN | 107079494 | 8/2017 |
| CN | 110856180 | 2/2020 |
| EP | 4132191 | 2/2023 |

OTHER PUBLICATIONS

Nokia et al., "Summary of Email Discussion on URLLC/IIOT Operation Support in Unlicensed Spectrum", 3GPP TSG-RAN, RP-200802, Jul. 3, 2020.

(Continued)

*Primary Examiner* — Harry H Kim
(74) *Attorney, Agent, or Firm* — Fay Kaplun & Marcin, LLP

(57) ABSTRACT

A base station (BS) configures a user equipment (UE) with parameters for channel access operations on a shared channel. The BS transmits to the UE a first configuration for a BS-initiated fixed frame period (FFP) (BS-FFP) and a second configuration for a UE-initiated FFP (UE-FFP), wherein the BS-FFP overlaps the UE-FFP, schedules an uplink (UL) transmission during the UE-FFP and when there is no downlink (DL) transmission in the BS-FFP, receiving the UL transmission from the UE during the BS-FFP.

18 Claims, 7 Drawing Sheets

(56) References Cited

U.S. PATENT DOCUMENTS

| | | | |
|---|---|---|---|
| 2017/0318607 A1* | 11/2017 | Tiirola | H04W 4/10 |
| 2019/0335456 A1 | 10/2019 | Yerramalli et al. | |
| 2020/0037354 A1 | 1/2020 | Li et al. | |
| 2021/0100030 A1 | 4/2021 | Myung et al. | |
| 2022/0007231 A1* | 1/2022 | Basu Mallick | H04W 28/0289 |
| 2022/0377790 A1 | 11/2022 | Awadin et al. | |
| 2022/0386371 A1 | 12/2022 | Jiang | |
| 2022/0400516 A1* | 12/2022 | Zhou | H04W 74/0808 |
| 2023/0140333 A1* | 5/2023 | Wang | H04W 4/02 370/329 |
| 2023/0141148 A1 | 5/2023 | Singh et al. | |
| 2023/0141989 A1 | 5/2023 | Bagheri et al. | |
| 2023/0189304 A1* | 6/2023 | Zhang | H04W 72/50 370/329 |
| 2023/0189338 A1 | 6/2023 | Singh et al. | |
| 2023/0354275 A1* | 11/2023 | Moon | H04W 74/0808 |
| 2023/0362989 A1* | 11/2023 | Bagheri | H04L 1/1896 |

OTHER PUBLICATIONS

Intel Corporation, "Channel Access Mechanism for NR-Unlicensed", 3GPP TSG RAN, R1-1906785, May 17, 2019.
Samsung. "Channel access procedures for NR-U", 3GPP TSG-RAN WG1 Meeting #99, R1-1912449, Nov. 8, 2019, 13 sheets.

* cited by examiner

BASE STATION OPERATIONS DURING A UE-INITIATED CHANNEL ACCESS PROCEDURE

BACKGROUND INFORMATION

A user equipment (UE) may be configured to establish a connection with a network. In one example, the UE may connect to a 5G New Radio (NR) network. While connected to the 5G NR network, the UE may utilize capabilities associated with the network. In the 5G NR standards, NR-U relates to the management of the unlicensed (shared) spectrum. Similar to Licensed Assisted Access (LAA) in the LTE standards, NR-U provides a modification to the carrier aggregation (CA) functionality that allows unlicensed bandwidths to be used for a secondary component carrier (SCC). NR-U may also be utilized in a standalone configuration, where a single NR cell provides an unlicensed bandwidth for data transmissions.

NR-U is designed to maintain fair coexistence with other incumbent technologies using the shared spectrum, such as WiFi, and in order to do so, depending on the particular band in which it may operate, some regulatory restrictions may apply. For instance, if operating in the 5GHz band, a listen before talk (LBT) procedure may be required to acquire the medium before a transmission can occur. An LBT such as a clear channel assessment (CCA) may be performed by a next generation node B (gNB) on a downlink (DL) channel prior to a DL transmission occurring. Currently, a UE is allowed to perform (UL) transmissions only if a DL signal or channel is first detected. This requirement may increase UL latency, especially for physical resource access channels (PRACH) and some latency-sensitive service types, such as ultra-reliable low latency communications (URLLC).

SUMMARY

Some exemplary aspects are related to a base station having a transceiver and one or more processors. The transceiver is configured to connect to a user equipment (UE) over a shared channel subject to channel access operations. The one or more processors are communicatively coupled to the transceiver and configured to perform operations. The operations include transmitting to the UE a first configuration for a BS-initiated fixed frame period (FFP) (BS-FFP) and a second configuration for a UE-initiated FFP (UE-FFP), wherein the BS-FFP overlaps the UE-FFP, scheduling an uplink (UL) transmission during the UE-FFP and when there is no downlink (DL) transmission in the BS-FFP, receiving the UL transmission from the UE during the BS-FFP.

Other exemplary aspects are related to a baseband processor that performs operations. The operations include transmitting, to a user equipment (UE), a first configuration for a base station (BS)-initiated fixed frame period (BS-FFP) and a second configuration for a UE-initiated FFP (UE-FFP), wherein the BS-FFP overlaps the UE-FFP, scheduling an uplink (UL) transmission during the UE-FFP and when there is no downlink (DL) transmission in the BS-FFP, receiving the UL transmission from the UE during the BS-FFP.

DETAILED DESCRIPTION

Figure 1:
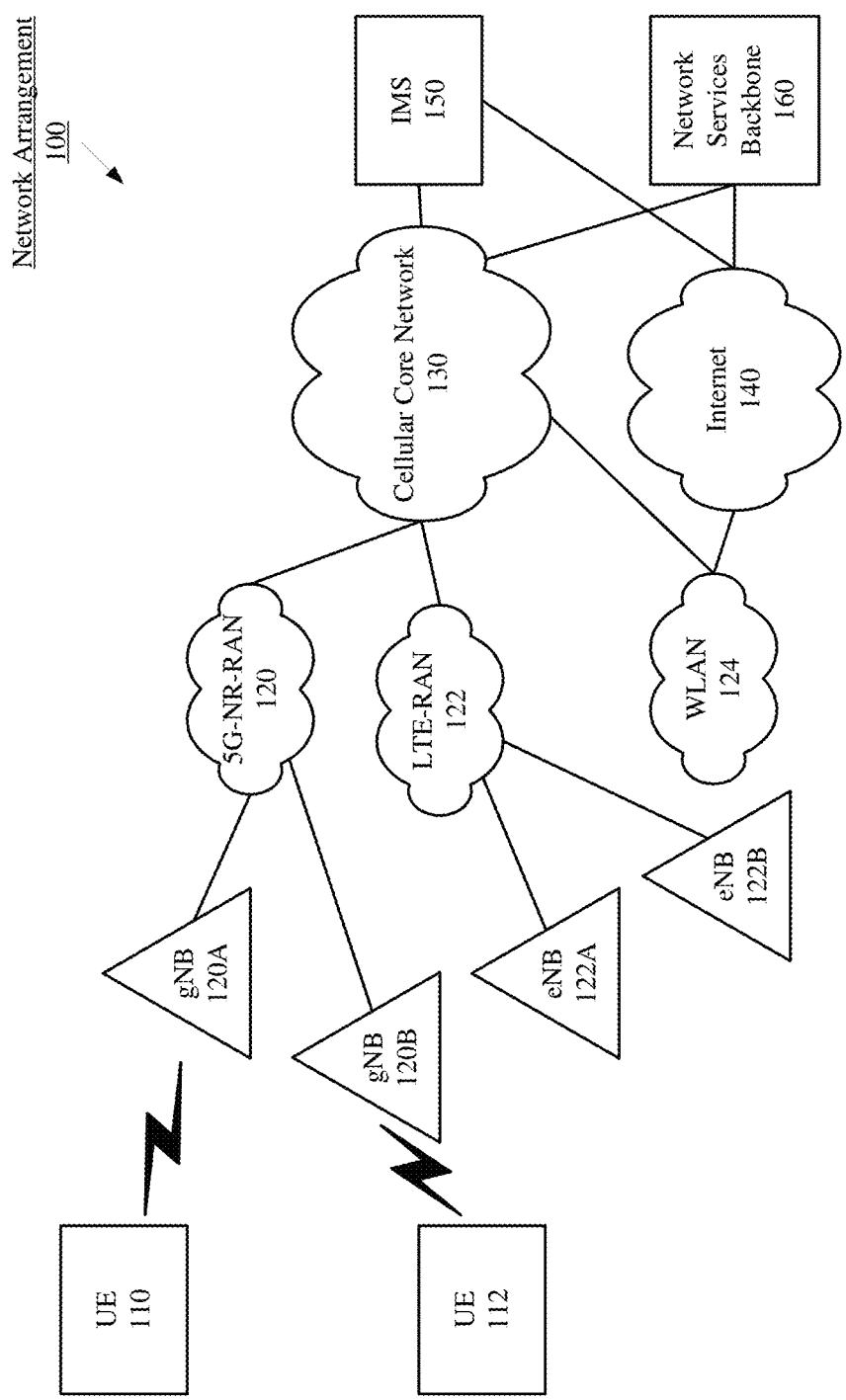
FIG. 1 shows an exemplary network arrangement according to various exemplary aspects.

The exemplary aspects may be further understood with reference to the following description and the related appended drawings, wherein like elements are provided with the same reference numerals. The exemplary aspects describe configurations for a user equipment (UE) where the UE may, under certain conditions, initiate a channel access procedure for determining a channel status for a scheduled uplink (UL) transmission. The exemplary UE may, in some aspects, be configured with two fixed frame periods (FFPs), one corresponding to a channel access procedure initiated by a new generation node B (gNB), and the other corresponding to a channel access procedure initiated by the UE. The gNB-initiated channel access procedure may include a frame based equipment (FBE) listen before talk (LBT) operation, followed by the gNB-FFP, during which, when the FBE is successful at the gNB, the UE may detect a downlink (DL) transmission. In some aspects, when a DL transmission is not detected and certain conditions are met for a scheduled UL transmission, the UE may initiate its own channel access procedure including an FBE that, when successful, allows the UE to perform the scheduled UL transmission. In still other aspects, rather than configuring a UE-FFP, the UE may perform some UL transmissions when the UL transmissions are located within particular symbols in the gNB-FFP.

Although the exemplary aspects will be described with regard to the 5G NR network, those skilled in the art will understand the exemplary aspects may be modified and/or used with any network that supports a functionality that utilizes bandwidths outside a designated or licensed spectrum that may be shared amongst radio access technologies (RATs). For example, a legacy network such as LTE supports CA functionalities where an SCC may be established for an unlicensed band and certain of the exemplary aspects may be used with such a network, e.g. when Licensed Assisted Access (LAA) functionality is configured. In addition, NR-U may be used as a standalone functionality for connecting to an unlicensed bandwidth, independent from any CA operation. Thus, the exemplary aspects described below may be used in a CA configuration or in the absence of a CA configuration.

Network/Devices

FIG. 1 shows an exemplary network arrangement 100 according to various exemplary aspects. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary aspects described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary aspects, the UEs 110, 112 may establish a connection with the 5G NR-RAN 122 and/or the LTE-RAN 120.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary aspects may apply to any appropriate number of gNBs. Specifically, the UEs 110, 112 may simultaneously connect to and exchange data with a plurality of gNBs 120A, 120B in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B. The UE 110 connection to gNB 120A may be, for example, an NR-U connection utilizing an unlicensed portion of the RF spectrum.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
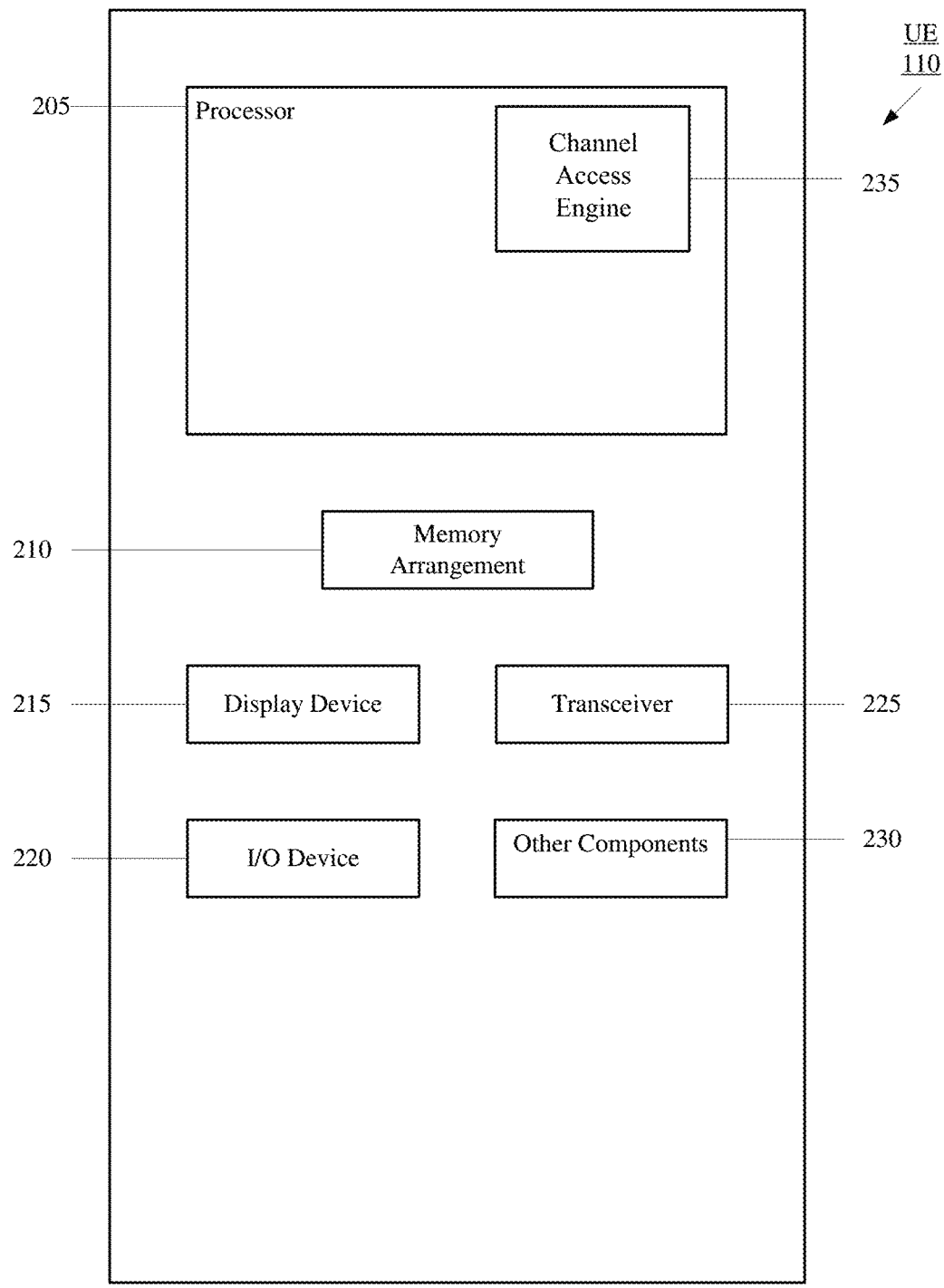
FIG. 2 shows an exemplary UE according to various exemplary aspects.

FIG. 2 shows an exemplary UE 110 according to various exemplary aspects. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a channel access engine 235 for performing operations including initiating a channel access procedure at the UE. The channel access procedure may include an FBE followed by a UE fixed frame period (FFP) comprising a channel occupancy time (COT) during which the UE may perform a UL transmission, to be described in detail below. In other aspects, the channel access engine 235 may cause the processor to perform operations including initiating an FBE during a gNB-FFP and performing a UL transmission when the UL transmission is located within particular symbols of the gNB-FFP, to be described in detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
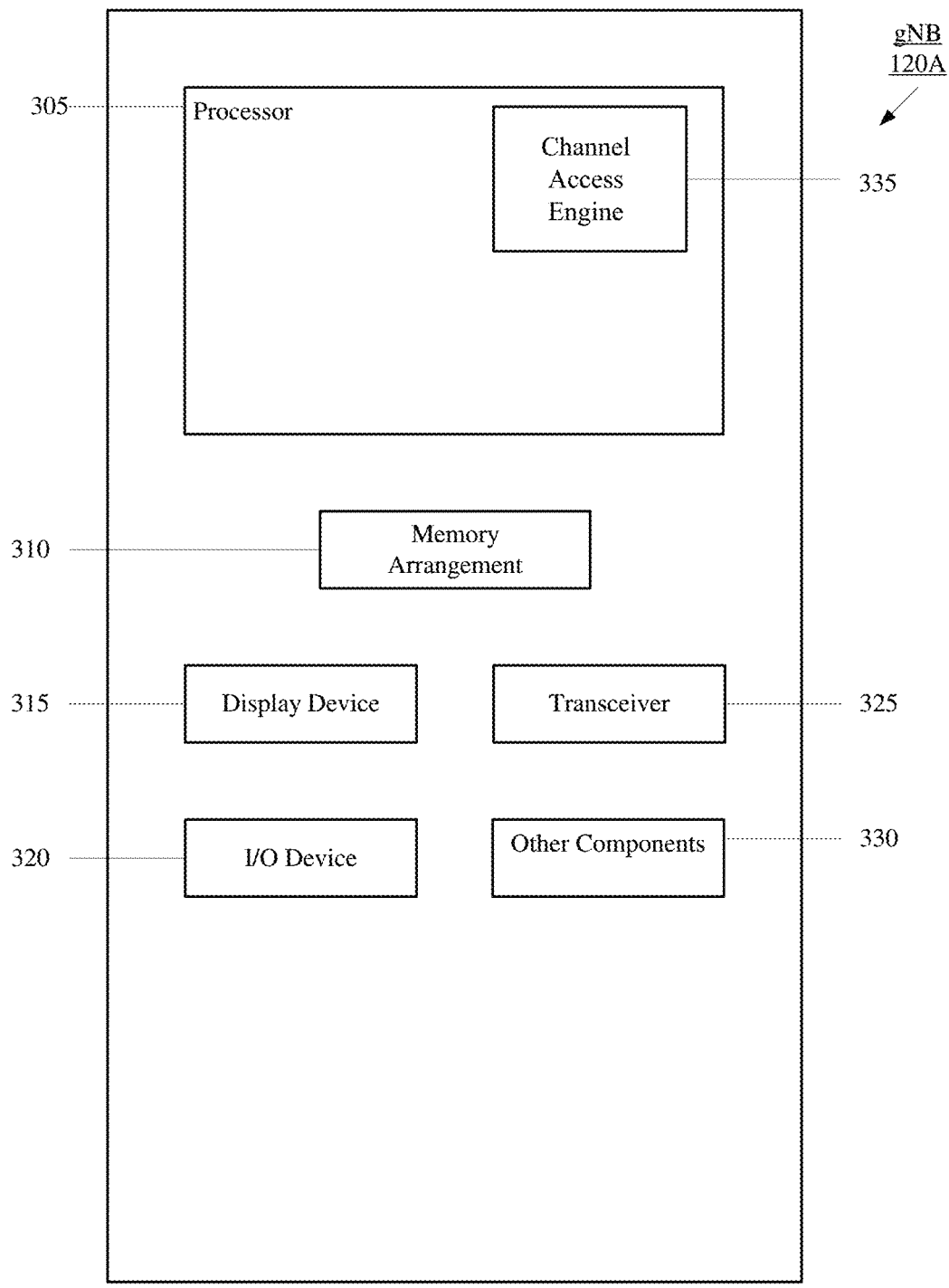
FIG. 3 shows an exemplary network cell according to various exemplary aspects.

FIG. 3 shows an exemplary network cell, in this case gNB 120A, according to various exemplary aspects. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a channel access engine 235 for performing operations including configuring a UE with a UE-FFP during which the UE may send UL transmissions, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

Channel Access Procedures on Shared Channels

NR-U is designed to maintain fair coexistence with other incumbent technologies using the shared spectrum, such as WiFi, and in order to do so, depending on the particular band in which it may operate, some regulatory restrictions may apply. For instance, if operating in the 5GHz band, a listen before talk (LBT) procedure may be used to acquire the medium before a transmission can occur. For example, a clear channel assessment (CCA) may be performed by a next generation node B (gNB) on a downlink (DL) channel prior to a DL transmission occurring to a user equipment (UE). However, Rel-16 NR-U currently supports only the gNB as the initiating device for a CCA. Consequently, the UE is allowed to perform (UL) transmissions only if a DL signal or channel, for example a physical downlink control channel (PDCCH), a synchronization signal block (SSB), a system information block (SIB) (e.g. RMSI), or a group common (GC) PDCCH, is first detected in a fixed frame period (FFP).

An FFP is a time resource for a UE that is made available for sending/receiving transmissions. The FFP length and starting position (timing offset) are parameters provided by the network in, for example, SIB1 information. Each frame period consists of a channel occupancy time (COT) and an idle period at the end of the FFP, after which the FFP repeats. A gNB may perform an LBT, such as a frame based equipment (FBE) operation, e.g. one-shot CCA, during the idle period prior to the next FFP and, if the CCA is successful, perform DL signaling or data transmission at the beginning of the FFP. If the DL transmission is detected at the UE, the UE is allowed to perform UL transmissions within the FFP. The COT may be dimensioned according to rules defined for the FBE. For example, an idle period may be no shorter than 5% of the FFP and a COT may be no longer than 95% of the FFP.

Figure 4:
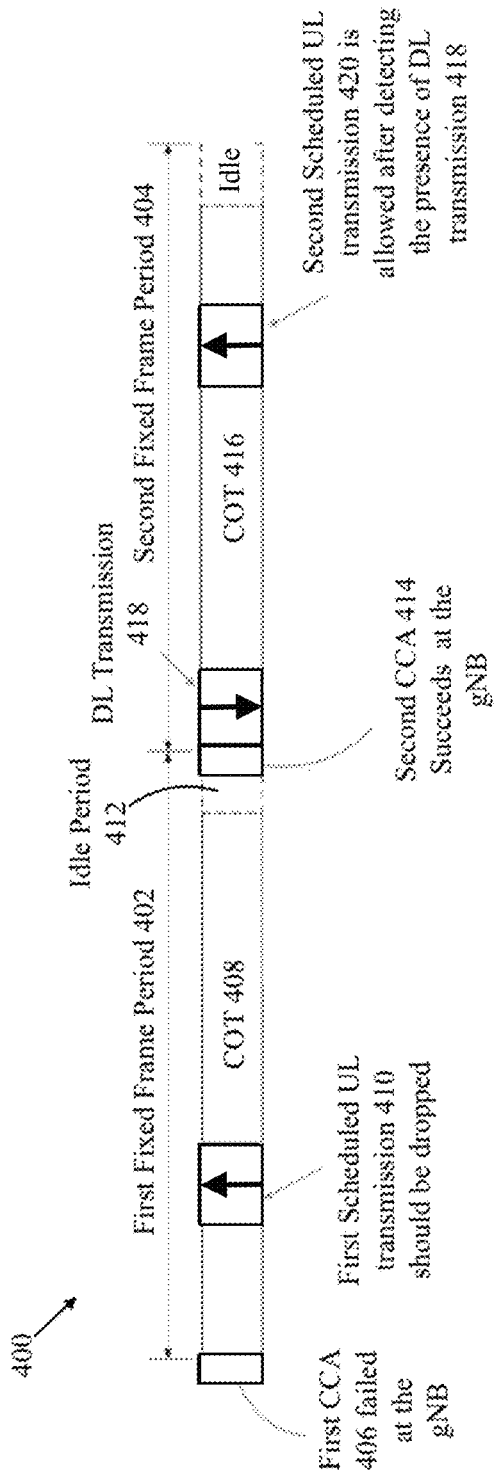
FIG. 4 shows a diagram for a channel access procedure operation for an NR-U unlicensed channel in which only a gNB is allowed to initiate a frame based equipment (FBE) listen before talk (LBT) operation, e.g. a clear channel assessment (CCA).

FIG. 4 shows a diagram 400 for a channel access procedure operation for an NR-U unlicensed channel in which only a gNB is allowed to initiate a frame based equipment (FBE) listen before talk (LBT) operation, e.g. a clear channel assessment (CCA). The exemplary diagram 400 includes a first FFP 402 followed by a second FFP 404. A first CCA 406 is performed by the gNB prior to the first FFP 402, the first FFP 402 having a first scheduled UL transmission 410 in its COT 408. In this exemplary operation, it may be considered that the first CCA 406 failed at the gNB. Thus, the gNB does not transmit on the DL during the first COT 408. Because the UE does not detect any DL transmissions prior to the first scheduled UL transmission 410, the UL transmission 410 is dropped. A second CCA 414 is performed by the gNB in the idle period 412 at the end of the first FFP 402 and prior to the COT 416 of the second FFP 404. In this exemplary operation, it may be considered that the second CCA 414 is successful at the gNB. Thus, the gNB transmits on the DL 418 during the COT 416 and the UE detects the DL transmission 418 prior to a second scheduled UL transmission 420 in the COT 416. Because the UE detects the DL transmission 418 prior to the second scheduled UL transmission 420, the UE performs the second scheduled UL transmission 420.

As shown in the exemplary diagram 400, the requirement for the UE to first detect a DL transmission/signal prior to transmitting on the UL may increase UL latency, considering the UE was required to wait until the second COT 416 to perform an UL transmission 420. This increased latency may be especially impactful for physical resource access channels (PRACH) and some latency-sensitive service types, such as ultra-reliable low latency communications (URLLC). For example, such a requirement may make it not feasible to operate URLLC services on an unlicensed band.

UE-Initiated COT for FBE Operation

According to some exemplary aspects, a UE is configured to initiate an FBE and establish a second fixed frame period (FFP)/channel occupancy time (COT) within which to transmit UL data, for example high priority data such as URLLC communications, when a gNB-initiated FBE is unsuccessful. For example, the UE may be configured with a first FFP and corresponding offset configuration for the gNB as the FBE-initiating device (hereafter referred to as a "gNB-FFP") and a second FFP and corresponding offset configuration for the UE as the FBE-initiating device (hereafter referred to as a "UE-FFP"). The UE-FFP may be configured to be shorter than the gNB-FFP, such that one or more UE-FFPs may fall within the gNB-FFP. For example, the UE-FFP may be configured relative to the gNB-FFP, e.g. as a percentage of the gNB-FFP. The candidate percentage values X for the period of the UE-FFP may be fixed, for example, in the 3GPP Standards for the UE at values of, e.g., 0, 15, 30, 45, 60 and 95 percent of the period of the gNB-FFP, wherein a value of 0, when configured, indicates that the UE is not allowed to be an FBE-initiating device. The UE-FFP may be configured by either a system information block (SIB), e.g. in SIB1 (common for all UEs within a same serving cell), or by dedicated RRC signaling.

Figure 5:
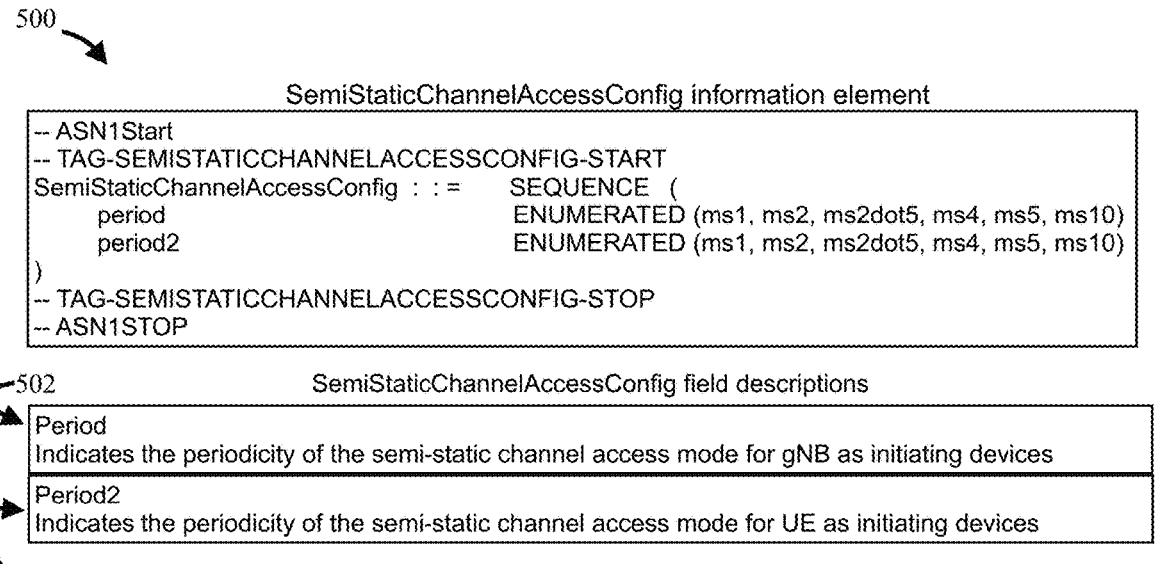
FIG. 5 shows an information element (IE) for semi-static channel access configuration information (SemiStaticChannelAccessConfig) for transmission in a system information block (SIB) to a UE.

FIG. 5 shows an information element (IE) 500 for semi-static channel access configuration information (SemiStaticChannelAccessConfig) for transmission in a system information block (SIB) to a UE. The IE 500 may be an ASN.1 message providing for separate FBE configuration parameters to enable the UE to act as the FBE-initiating device. In this example, the IE 500 includes a first row (period) 502 for configuring the gNB-FFP and offset and a second row (period2) for configuring the UE-FFP and offset. In the IE 500, the second row includes parameters corresponding to each of those included for the first row. However, as mentioned above, in some aspects, the UE-FFP configuration may be indicated as a percentage "X" of the period in the first row. For example, the value of X can be a fractional or integer number. In one aspect, candidate X values may be fixed in specification e.g. X=<0,15,30,45,60,95>%, with the value "0" indicating the UE is not allowed to initiate a COT.

When configured to initiate an FFP, the UE may perform an LBT operation such as, a CCA, during a single observation period, e.g. Tsl=9 microseconds, immediately before starting transmissions at the start of the UE-FFP. The UE may perform the LBT operation and initiate the COT if the following two conditions are met. First, the UE does not detect any DL transmission burst(s) from the gNB at predefined time instances within the gNB-FFP before the start of the UE-FFP. As described above, the gNB-FFP overlaps at least part of one or multiple UE-FFPs, but the UE CCA (during the observation period immediately prior to the UE-FFP) may not be initiated during predefined times of the gNB-FFP when DL transmission burst(s) are expected. In some aspects, the predefined time instances at least include symbols configured for PDCCH, SSB and periodic CSI-RS monitoring.

Regarding the second condition, prior to initiating the UE CCA, the UE should have at least one PUSCH dynamically granted by a DCI Format (DG-PUSCH), or a configured grant (CG) PUSCH transmission(s) (CG-PUSCH), in the UE-FFP. In other words, a DG-PUSCH or a CG-PUSCH should be scheduled during the UE-FFP although the actual CG-PUSCH or DG-PUSCH transmission is subject to the outcome of CCA. Alternatively, some other "predefined" UL transmissions scheduled during the UE-FFP may trigger the UE CCA to initiate a COT.

In some aspects, for the second condition, the aforementioned DG-PUSCH and CG-PUSCH may be associated with a predefined channel access priority class (CAPC) 'p.' For example, only high priority data e.g. having a priority class of "1" or "2," may trigger the UE to initiate the UE-FFP. In this situation, a CAPC threshold Tp would be 2, where p≤Tp (e.g., higher priority package) allows triggering the UE CCA and associated UE-COT to occur. For DG-PUSCH transmissions, the CAPC value of 'p' may be indicated in the scheduling DCI corresponding to the UL transmission. For CG-PUSCH, the CAPC value of 'p' may be determined based on a 5G QoS identifier (5QI) values of all the quality of service (QoS) flows multiplexed in the CG-PUSCH.

In other aspects, for the second condition, the aforementioned CG-PUSCH corresponding to a configured grant may have a priority value set to 1 in a ConfiguredGrantConfig IE, indicating the CG-PUSCH is high priority. The DG-PUSCH is a PUSCH scheduled by the PDCCH, and may be indicated as higher priority by using a priority indicator field in the scheduling DCI. In still other aspects, the so-called "predefined" UL transmissions mentioned above in the second condition include, e.g., UL transmissions related to a RACH procedure (e.g. PRACH transmissions) and higher priority uplink control information (UCI) transmissions (e.g. HARQ-ACK and SR transmissions over PUCCH or PUSCH). In another aspect, SRS transmissions may also be included in the "predefined" UL transmissions.

Figure 6:
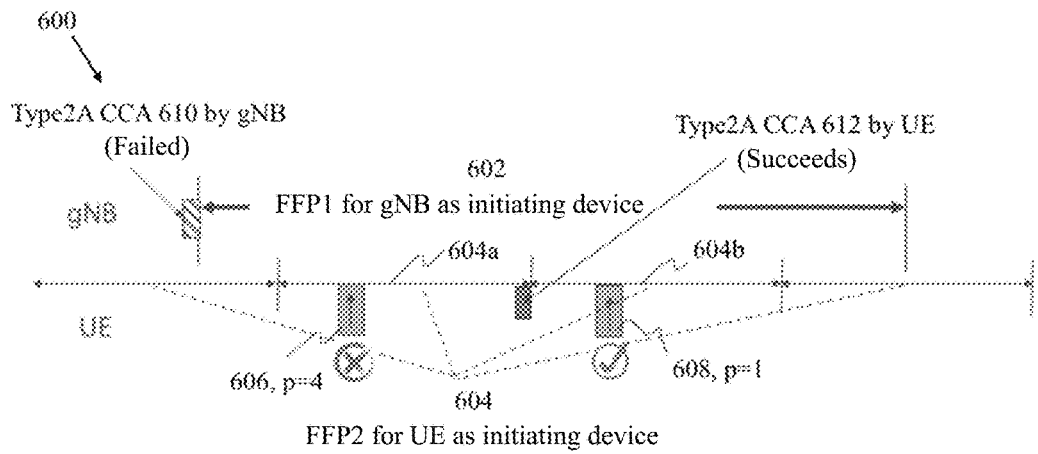
FIG. 6 shows a diagram of FBE operation for a UE-initiated FFP according to one exemplary aspect.

FIG. 6 shows a diagram 600 of FBE operation for a UE-initiated FFP according to one exemplary aspect. The FBE in this exemplary aspect is described as a Type 2A CCA for both the gNB-initiated and UE-initiated FFPs (gNB-FFP and UE-FFP). However, in other aspects, other LBT categories e.g. Type 1 CCA may be used. The diagram 600 will be described relative to the method 700 shown in FIG. 7.

Figure 7:
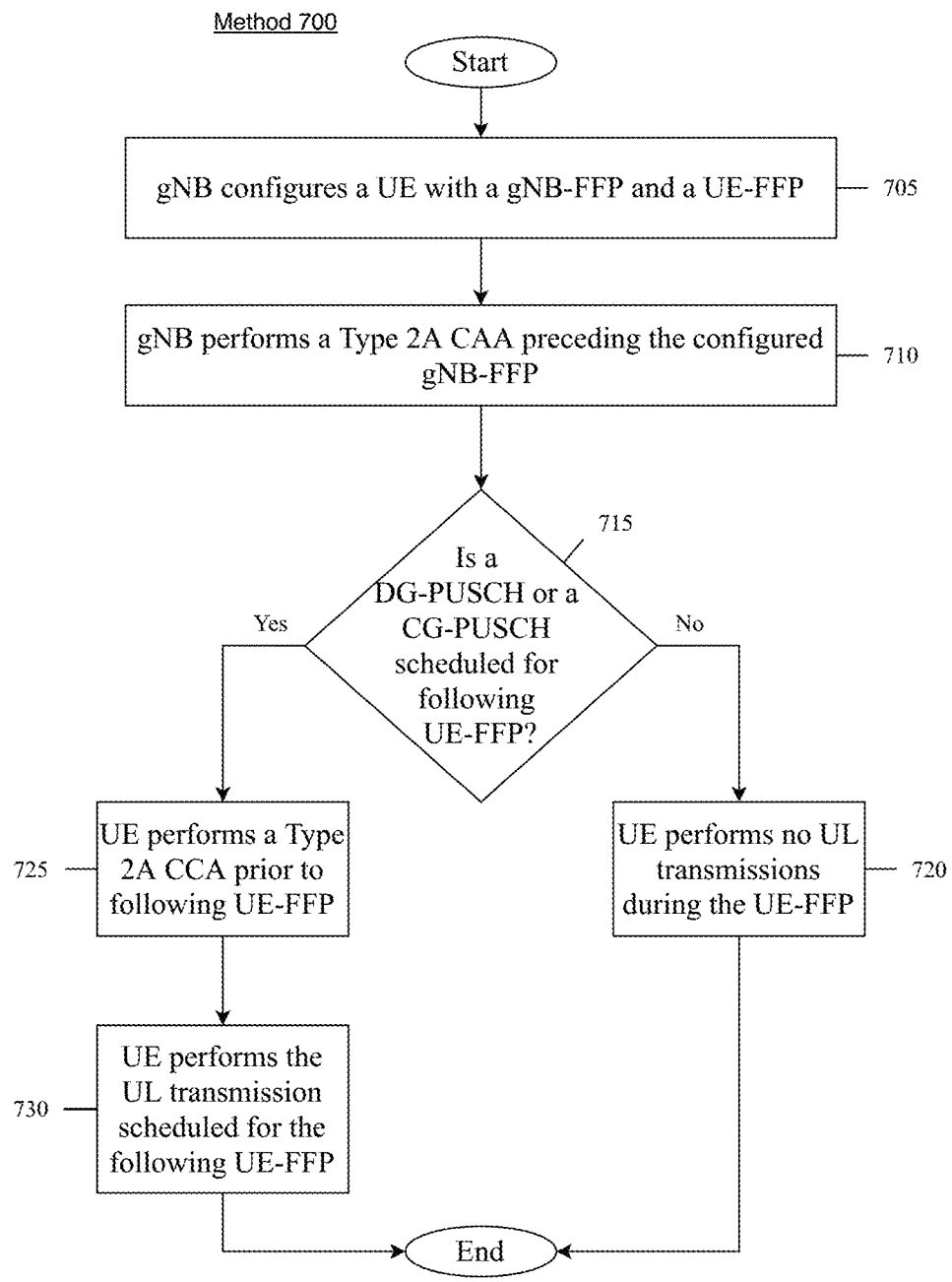
FIG. 7 shows a method for FBE operation for a UE-initiated FFP according to various exemplary aspects.

FIG. 7 shows a method 700 for FBE operation for a UE-initiated FFP according to various exemplary aspects. In 705, a gNB configures a UE with a gNB-FFP and a UE-FFP, as described above. In the example of FIG. 6, the gNB-FFP 602 overlaps multiple UE-FFPs 604, subject to the first condition discussed above, where the UE does not perform a CCA (prior to the UE-FFP) during the predefined time instances during which the UE may detect a DL transmission burst(s) from the gNB. Two UL grants are configured for the UE, specifically a first UL grant 606 that is, in this aspect, a DG-PUSCH scheduled with a CAPC value of p=4 by a scheduling DCI and a second UL grant 808 that is, in this aspect, a CG-PUSCH determined to have a CAPC value of p=1 based on 5QI values of a corresponding data flow. The threshold p value Tp, in this aspect, has a value of 2. Thus, when p≤2, the UE-FFP may be allowed to occur. The first UL grant 606 is scheduled during UE-FFP 604a, while the second UL grant 608 is scheduled during UE-FFP 604b.

In 710, the gNB performs a Type 2A CAA preceding the configured gNB-FFP. In the example of FIG. 6, the gNB-initiated CAA 610 is performed before the gNB-FFP 602. In this example, the CAA 610 fails at the gNB, preventing the gNB from transmitting a DL transmission burst within the gNB-FFP 602. Accordingly, the UE does not detect any DL transmission bursts during the predefined time instance(s) discussed above.

In 715, based on not detecting a DL transmission burst during the predefined times, the UE determines whether a DG-PUSCH or a CG-PUSCH, meeting the configured conditions, is scheduled for the following UE-FFP. In the example of FIG. 6, the DG-PUSCH 606 is scheduled in the UE-FFP 604a following the gNB CCA. However, the priority p=4 of the DG-PUSCH 606 is greater than the threshold value Tp=2. Accordingly, the conditions are not met.

In 720, when the UE determines that no DG-PUSCH or CG-PUSCH meeting the conditions is scheduled for the following UE-FFP, the UE performs no UL transmissions during the UE-FFP. In other words, in the example of FIG. 6, the UE drops the scheduled DG-PUSCH transmission 606. If further UE-FFPs are established prior to the end of the gNB-FFP, then the method returns to 720 and the UE performs the same determination for the further UE-FFP(s). In the example of FIG. 6, the UE determines the CG-PUSCH 608 is scheduled in the UE-FFP 604b. The CG-PUSCH 608 has a priority p=1 that is less than or equal to the threshold value Tp=2. Accordingly, the conditions for the scheduled UL transmission 608 are met.

In 725, when the UE determines that a DG-PUSCH or a CG-PUSCH meeting the conditions is scheduled for the following UE-FFP, the UE performs a Type 2A CCA prior to the following UE-FFP. In the example of FIG. 6, the UE-initiated CAA 612 is performed before the UE-FFP 604b. In this example, the CAA 612 is successful at the UE, allowing the UE to access the channel for UL.

In 730, when the CCA is successful, the UE performs the UL transmission scheduled for the following UE-FFP. In the example of FIG. 6, based on the successful CAA 612 (which is only allowed to occur once the UL transmission conditions are met for the UE-FFP), the UE performs the CG-PUSCH transmission 608.

According to some exemplary aspects, the UE may perform a Type 1 channel access procedure for the UE-FFP instead of a Type 2A channel access procedure. The UE may perform the Type 1 FBE operation if the Type 1 operation is configured and the two aforementioned conditions are met. Those skilled in the art will understand that a general characteristic of a Type 2A channel access procedure is that the device (e.g., UE) will transmit as soon as the channel is sensed as clear. Ion the other hand, a Type 1 channel access procedure may have the UE sense that multiple slots are clear. Thus, in the exemplary aspects related to a Type 1 CCA, the UE may maintain a contention window value CWp and adjust for transmissions corresponding to each channel access priority class (CAPC) 'p', e.g., the number of clear slots to be sensed may depend on the CAPC.

According to other exemplary aspects, an energy detection threshold XThreshUE used by the UE for the CCA may be configured separately by higher layers. Those skilled in the art will understand that the energy detection threshold is the minimum amount of energy required to declare the channel busy during the CCA procedure. The UE may autonomously select one of a set of energy detection thresholds based on the associated PUSCH transmission parameters, e.g. priority class and/or 5QI value (latency requirement). For example, for higher priority classes, the UE may set the energy detection threshold higher to attempt a transmission even if the channel is potentially occupied. In some aspects, the set of energy detection thresholds may be derived based on a basic threshold value and a number of offset values to this basic threshold. The offset values may be determined based at least on the corresponding CAPC values.

In still other exemplary aspects, the UE may share the UE-initiated COT with the gNB. In this way, the gNB may preserve resources if it has knowledge of when, if at all, the UE will initiate a UL transmission. The UE may inform the gNB of the sharing either implicitly or explicitly. In a first option, the detection of a PUSCH transmission (e.g., DG-PUSCH or CG-PUSCH) for the UE serves as an implicit indicator to share the corresponding UE-FFP with the gNB. In a second option, 1-bit may be encoded into uplink control information (UCI) to indicate whether the UE-FFP can be shared with the gNB or not. This provides the flexibility to select different energy thresholds, as discussed above, for CCA operation and then correspondingly indicate the UE-FFP sharing. In a third option, the UE provides a row index of a table configured by higher layers e.g. RRC signaling, where a number of slots for sharing, an offset indicating where the UL transmission starts, and a CAPC for the UL transmission are jointly encoded. One row may indicate no COT sharing with the gNB.

Conditional CCA for PUSCH Transmission in FBE Operation

In some exemplary aspects, the UE may additionally perform CCA for a given UL transmission (e.g., DG-PUSCH or CG-PUSCH), if the UL transmission is aligned with a gNB-FFP boundary or if the gap between the start of the gNB-FFP and the beginning of the PUSCH symbol is less than N2 symbols. If the condition is met, the UE may transmit the PUSCH immediately after sensing the channel to be idle for at least a sensing slot duration Tsi=9 microseconds. This configuration is based on a minimum scheduling delay between PDCCH and PUSCH being N2 symbols, making it impossible to schedule a PUSCH transmission by PDCCH within a same gNB-FFP.

Figure 8:
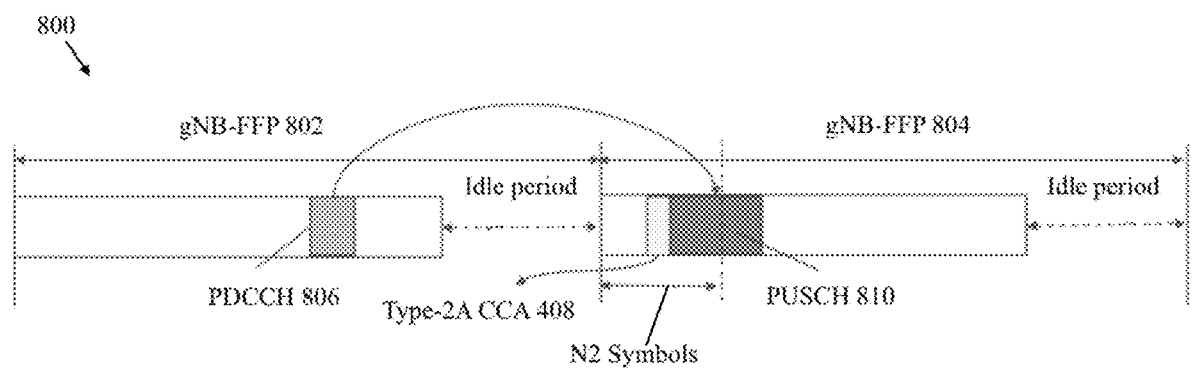
FIG. 8 shows a diagram of conditional CCA operation initiated by a UE according to one exemplary aspect.

FIG. 8 shows a diagram 800 of conditional CCA operation initiated by a UE according to one exemplary aspect. As discussed above, the conditional CCA operation depends on the presence of a CG-PUSCH or a DG-PUSCH having at least one symbol within a timing window, which starts from the beginning of one gNB-FFP and has a duration of N2 symbols. Referring to FIG. 8, the gNB-FFP 802 includes a PDCCH transmission 806 and the gNB-FFP 804 includes a PUSCH transmission 810. UE performs a Type 2A CCA operation 808 to sense the channel availability immediately preceding the PUSCH transmission 810, as the first symbol(s) of the PUSCH 604 falls in the N2-symbol time window starting from the beginning of the gNB-FFP 804.

In other exemplary aspects, the UE does not perform CCA for UL transmissions if it does not detect any DL signal/channel that ends N1 symbols prior to the start of the UL transmission in the gNB-FFP, where N1 is the PDSCH to HARQ-ACK timeline capability of the UE.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A base station (BS), comprising:
   a transceiver configured to connect to a user equipment (UE) over a shared channel subject to channel access operations; and
   one or more processors communicatively coupled to the transceiver and configured to perform operations comprising:
      generating, for transmission to the UE, a first configuration for a BS-initiated fixed frame period (FFP) (BS-FFP) and a second configuration for a UE-initiated FFP (UE-FFP), wherein the BS-FFP overlaps the UE-FFP;
      generating, for transmission to the UE, downlink control information (DCI) scheduling an uplink (UL) transmission during the UE-FFP;
      when there is no downlink (DL) transmission in the BS-FFP, receiving the UL transmission from the UE during the BS-FFP; and
      receiving, from the UE, a row index of a table, wherein the BS includes the table and the row index of the table indicates a number of slots for sharing, an offset indicating where the UL transmission starts, and a priority for the UL transmission.

2. The BS of claim 1, wherein the operations further comprise:
   performing a channel access operation in an idle period of a BS-FFP immediately preceding the BS-FFP, wherein the channel access operation fails.

3. The BS of claim 2, wherein the BS channel access operation includes a frame-based equipment (FBE) listen before talk (LBT) operation (BS FBE).

4. The BS of claim 1, wherein the operations further comprise:
   scheduling one of a physical downlink control channel (PDCCH), a synchronization signal block (SSB) or a periodic channel status indicator reference signal (CSI-RS) for the UE during the BS-FFP.

5. The BS of claim 1, wherein the operations further comprise:
   configuring a priority value threshold for UL transmissions, wherein the UE performs UL transmissions based on at least the priority value threshold.

6. The BS of claim 5, wherein the UL transmission comprises a downlink control information (DCI)-granted physical uplink shared channel (PUSCH) (DG-PUSCH) and wherein the operations further comprise:
   indicating a priority of the UL transmission via DCI.

7. The BS of claim 5, wherein the UL transmission comprises a configured grant (CG) physical uplink shared channel (CG-PUSCH) and wherein the operations further comprise:
   indicating a priority of the UL transmission via the CG.

8. The BS of claim 7, wherein the priority is based on at least a Quality of Service (QoS) of flows multiplexed in the UL transmission.

9. The BS of claim 1, wherein the operations further comprise:
   determining whether the UE-FFP is to be shared with the BS based on at least receiving the UL transmission.

10. The BS of claim 1, wherein the operations further comprise:
    receiving, from the UE, uplink control information (UCI) including an indication of whether the UE-FFP is to be shared with the BS.

11. A baseband processor configured to perform operations comprising:
    generating, for transmission to a user equipment (UE), a first configuration for a base station (BS)-initiated fixed frame period (BS-FFP) and a second configuration for a UE-initiated FFP (UE-FFP), wherein the BS-FFP overlaps the UE-FFP;
    generating, for transmission to the UE, downlink control information (DCI) scheduling an uplink (UL) transmission during the UE-FFP;
    when there is no downlink (DL) transmission in the BS-FFP, receiving the UL transmission from the UE during the BS-FFP;
    receiving, from the UE, a row index of a table, wherein the BS includes the table and the row index of the table indicates a number of slots for sharing, an offset indicating where the UL transmission starts, and a priority for the UL transmission.

12. The baseband processor of claim 11, wherein the operations further comprise:
    performing a channel access operation in an idle period of a BS-FFP immediately preceding the BS-FFP, wherein the channel access operation fails.

13. The baseband processor of claim 11, wherein the operations further comprise:
    scheduling one of a physical downlink control channel (PDCCH), a synchronization signal block (SSB) or a periodic channel status indicator reference signal (CSI-RS) for the UE during the BS-FFP.

14. The baseband processor of claim 11, wherein the operations further comprise:
    configuring a priority value threshold for UL transmissions, wherein the UE performs UL transmissions based on at least the priority value threshold.

15. The baseband processor of claim 14, wherein the UL transmission comprises a downlink control information (DCI)-granted physical uplink shared channel (PUSCH) (DG-PUSCH), wherein the operations further comprise:
    indicating a priority of the UL transmission via DCI.

16. The baseband processor of claim 14, wherein the UL transmission comprises a configured grant (CG) physical uplink shared channel (CG-PUSCH) and wherein the operations further comprise:
    indicating a priority of the UL transmission via the CG, wherein the priority is based on at least a Quality of Service (QoS) of flows multiplexed in the UL transmission.

17. The baseband processor of claim 11, wherein the operations further comprise:
    determining whether the UE-FFP is to be shared with the BS based on at least receiving the UL transmission.

18. The baseband processor of claim 11, wherein the operations further comprise:
    receiving, from the UE, uplink control information (UCI) including an indication of whether the UE-FFP is to be shared with the BS.

* * * * *